(12) United States Patent
Tabor et al.

(10) Patent No.: US 9,037,769 B1
(45) Date of Patent: May 19, 2015

(54) SAS EXPANDER WITH MULTIMODE PHYS

(75) Inventors: Gregory Arthur Tabor, Colorado Springs, CO (US); John Matthew Adams, Colorado Springs, CO (US)

(73) Assignee: Maxim Integrated Products, Inc., San Jose, CA (US)

( * ) Notice: Subject to any disclaimer, the term of this patent is extended or adjusted under 35 U.S.C. 154(b) by 376 days.

(21) Appl. No.: 13/249,213

(22) Filed: Sep. 29, 2011

(51) Int. Cl.
*G06F 13/00* (2006.01)
*G06F 11/00* (2006.01)
*H04L 12/50* (2006.01)

(52) U.S. Cl.
CPC ..................................... *G06F 13/00* (2015.01)

(58) Field of Classification Search
USPC .......................................... 710/300; 370/357
See application file for complete search history.

(56) References Cited

U.S. PATENT DOCUMENTS

| | | | |
|---|---|---|---|
| 7,210,065 B2* | 4/2007 | Uddenberg et al. | 714/33 |
| 7,376,147 B2* | 5/2008 | Seto et al. | 370/465 |
| 7,412,631 B2* | 8/2008 | Uddenberg et al. | 714/47.1 |
| 8,065,401 B2* | 11/2011 | Day et al. | 709/223 |
| 8,095,722 B1* | 1/2012 | Liao et al. | 710/317 |
| 8,255,607 B2* | 8/2012 | Jones et al. | 710/316 |
| 2005/0251588 A1* | 11/2005 | Hoch et al. | 710/5 |
| 2006/0101171 A1* | 5/2006 | Grieff et al. | 710/36 |
| 2009/0168654 A1* | 7/2009 | Mies et al. | 370/241 |
| 2011/0239257 A1* | 9/2011 | Bar-Niv | 725/78 |

OTHER PUBLICATIONS

Maxim Integrated, VSC7154 36-PHY 1.5Gbps and 3.0 Gbps SAS Edge/fanout Expander with Table Routing and SSP engine, 2007.*

* cited by examiner

*Primary Examiner* — Paul R Myers
*Assistant Examiner* — Christopher A Daley
(74) *Attorney, Agent, or Firm* — TIPS Group

(57) ABSTRACT

A SAS expander including a switch core and a plurality of SAS expander phys coupled to the switch core, where at least two of the SAS expander phys are SAS expander multimode phys. In an embodiment, the SAS expander multimode phys include at least a normal operational mode and an alternate operational mode. In another embodiment, the SAS expander multimode phys also include a second alternate operational mode.

12 Claims, 7 Drawing Sheets

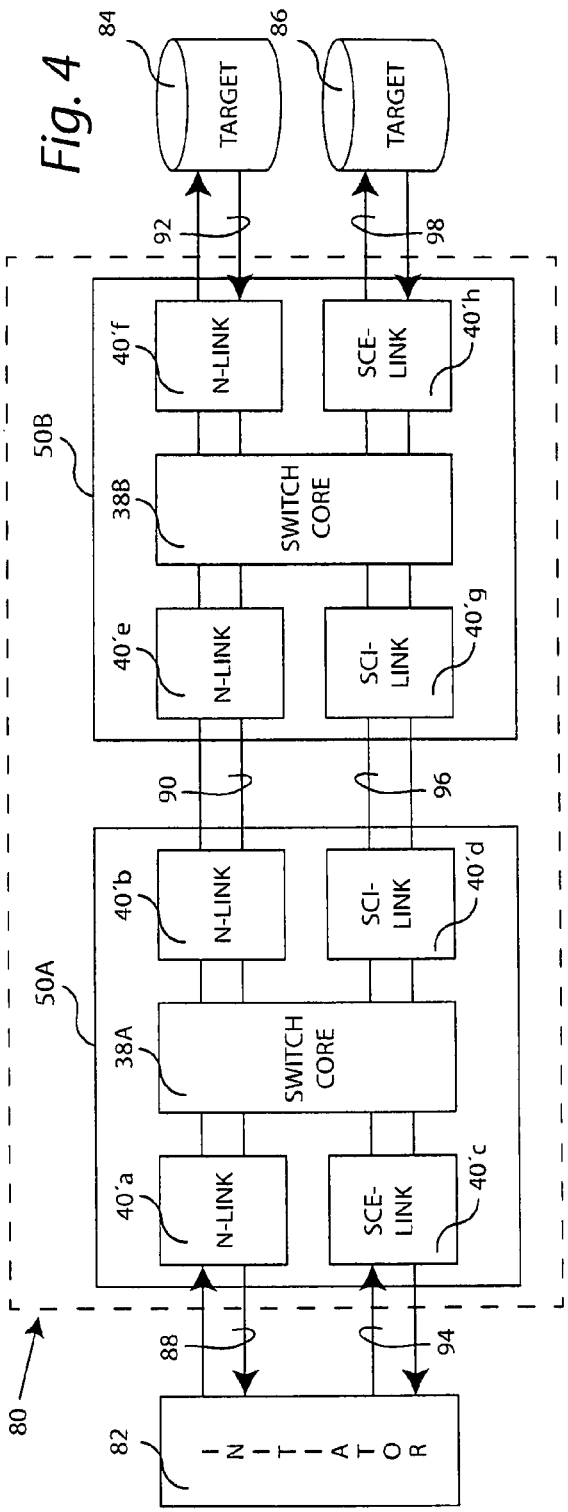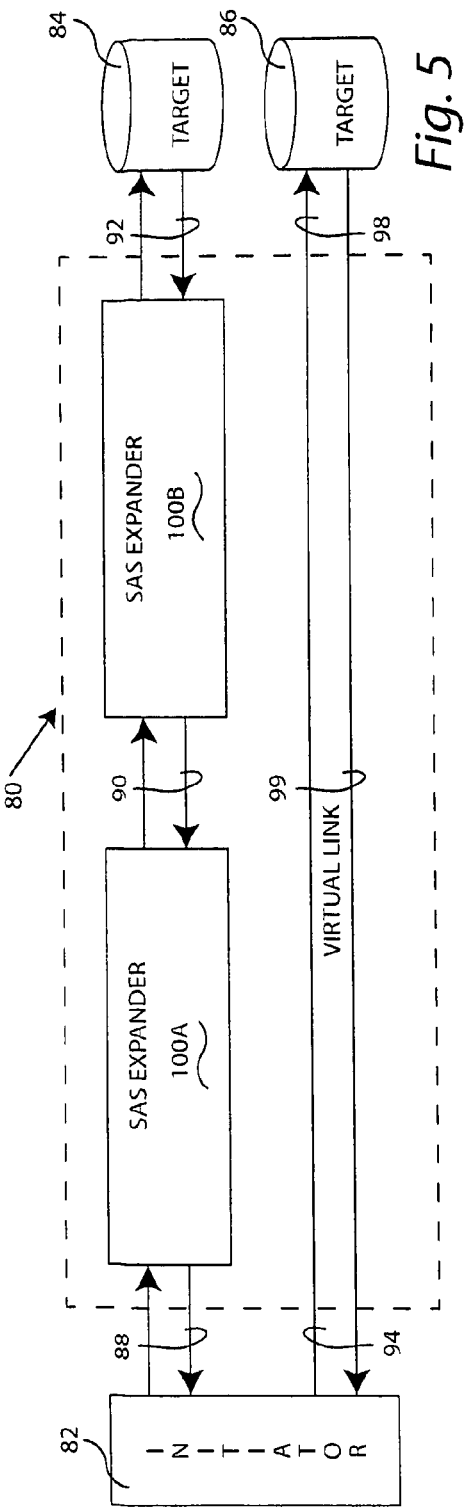

SAS EXPANDER WITH MULTIMODE PHYS

BACKGROUND

Serial Attached SCSI (SAS) is a computer bus used to move data to and from computer storage devices such as hard drives and tape drives. SAS depends on a point-to-point serial protocol that replaces the parallel SCSI bus technology that first appeared in the mid 1980s in data centers and workstations, and it uses the standard SCSI command set. A typical SAS system includes one or more "Initiators", one or more "Targets" and a "Service. Delivery Subsystem." A Service Delivery Subsystem may include one or more "Expanders."

An Initiator is a device that originates device-service and task-management requests for processing by a target device and receives responses for the same requests from other target devices. For example, Initiators may be provided as an on-board component on the motherboard (as is the case with many server-oriented motherboards) or as an add-on host bus adaptor.

A Target is a device containing logical units and target ports that receive service (e.g. disk service) and task management requests for processing and sends responses for the same requests to initiator devices. Examples of target devices are hard disks and disk array systems.

A Service Delivery Subsystem is part of an input/output (I/O) system that transmits information between an Initiator and a Target. Typically cables and connectors connecting an Initiator and a Target comprise a Service Delivery Subsystem. Optionally, Expanders or backplanes can be considered a part of the Service Delivery Subsystem.

Expanders are devices that form part of a Service Delivery Subsystem and facilitate communication between SAS devices. Expanders facilitate the connection of one or more Initiators to one or more Targets.

The SAS architecture includes six layers, namely the Physical layer, the Phy layer, the Link layer, the Port layer, the Transport layer and the Application layer. The T10 technical committee of the International Committee for Information Technology Standards (MOTS) and affiliates develop and maintain the SAS protocol and define the architecture of the various layers. See, for example, *Information technology—SAS Protocol Layer (SPL)*, Revision 07, 21 Jul. 2010, American National. Standard for Information Technology, Ref. No. ISO/IEC 14776-261:201X, incorporated herein by reference in its entirety.

Expanders, as noted above, can be used to allow one or more Initiators to communicate with one or more Targets. When a connection request is made by an Initiator for communication with a Target, or by a Target for a communication with an Initiator, one or more Expanders can attempt to provide a pathway between the Initiator and the Target. An Expander implementing SAS protocols as used herein may be alternatively referred to as a "SAS expander."

An example SAS expander 10 of the prior art includes a switch core 12, a number of SAS expander phys 14 coupled to the switch core 12, and one or more SMP internal ports 16 coupled to the switch core 12. The example prior art SAS expander 10 also includes a microcontroller (µC) 18 and memory 20. Example prior art SAS expander 10 may form a part of an integrated circuit 22, as will be appreciated by those of skill in the art.

The SAS expander phys 14 typically include a link layer 24, a phy layer 26 and a serial transceiver or "physical layer" 28. The SMP internal ports 16 typically each include a link layer 30 and a virtual phy connection 32. As noted by the bidirectional arrows 34, the SAS expander phys 14 each can operate as a connection originator and as a connection receptor.

A known attribute of SAS expanders is that a significant signal propagation delay or "latency" in data transmission is incurred due to the configuration and operation of the expanders. This latency of a Service Delivery Subsystem increases, for example, with the complexity of the subsystem and the number of expanders through which the signal must travel from the Initiator to the Target.

Latencies introduced by the normal operation of SAS expanders can become problematical when interacting with high speed Targets such as solid-state disk drives. In such situations, it may be preferable for a system designer to directly link (e.g. with a cable) an Initiator to a Target, bypassing the SAS expanders in the Service Delivery Subsystem. However, in certain cases, this can increase the design complexity and reduces the flexibility of the Service Delivery Subsystem.

These and other limitations of the prior art will become apparent to those of skill in the art upon a reading of the following descriptions and a study of the several figures of the drawing.

SUMMARY

By way of example and not limitation, an improved SAS, expander includes a switch core and a plurality of SAS expander phys coupled to the switch core, where at least two of the SAS expander phys are SAS expander multimode phys. In an embodiment, the SAS expander multimode phys include at least a normal operational mode and an alternate operational mode. In another embodiment, the SAS expander multimode phys also include a second alternate operational mode. In yet, further embodiments, the SAS expander multimode phys have two or more configurable operational modes and may or may not have a normal operational mode.

By way of further example and not limitation, a SAS Service Delivery Subsystem includes a first endpoint SAS expander including a first switch core and a first plurality of SAS expander phys coupled to the first switch core, where at least two of the first plurality of SAS expander phys are SAS expander multimode phys, and a second endpoint SAS expander including a second switch core and a second plurality of SAS expander phys coupled to the second switch core, where at least two of the second plurality of SAS expander phys are SAS expander multimode phys. In an embodiment, a first pair of SAS expander multimode phys of the first endpoint SAS expander and a second pair of SAS expander multimode phys of the second endpoint SAS expander form a portion of a "virtual link."

By way of further example and not limitation, a method for providing a virtual link with a SAS expander includes providing a SAS expander having a plurality of reconfigurable multimode phys and configuring at least a pair of the reconfigurable multimode phys to each being one of a static endpoint phy and a static infrastructure phy. In an embodiment, the reconfigurable multimode phys can be configured to be one of a normal, static endpoint and static infrastructure modes.

An advantage of certain example embodiments is that virtual links (which emulate physical links made by, for example, cables and wires) can be made with SAS expanders with SAS Service Delivery Subsystems employing SAS expanders. This can have the advantageous result of reducing latency in data and control signals being propagated by the SAS expanders.

These and other embodiments and advantages and other features disclosed herein will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 4 is a block diagram of an example Service Delivery Subsystem used to illustrate the operation of reduced latency virtual links between an Initiator and a Target;

FIG. 5 is a functionally equivalent block diagram of the example Service Delivery Subsystem of FIG. 4;

DETAILED DESCRIPTIONS

Figure 1:
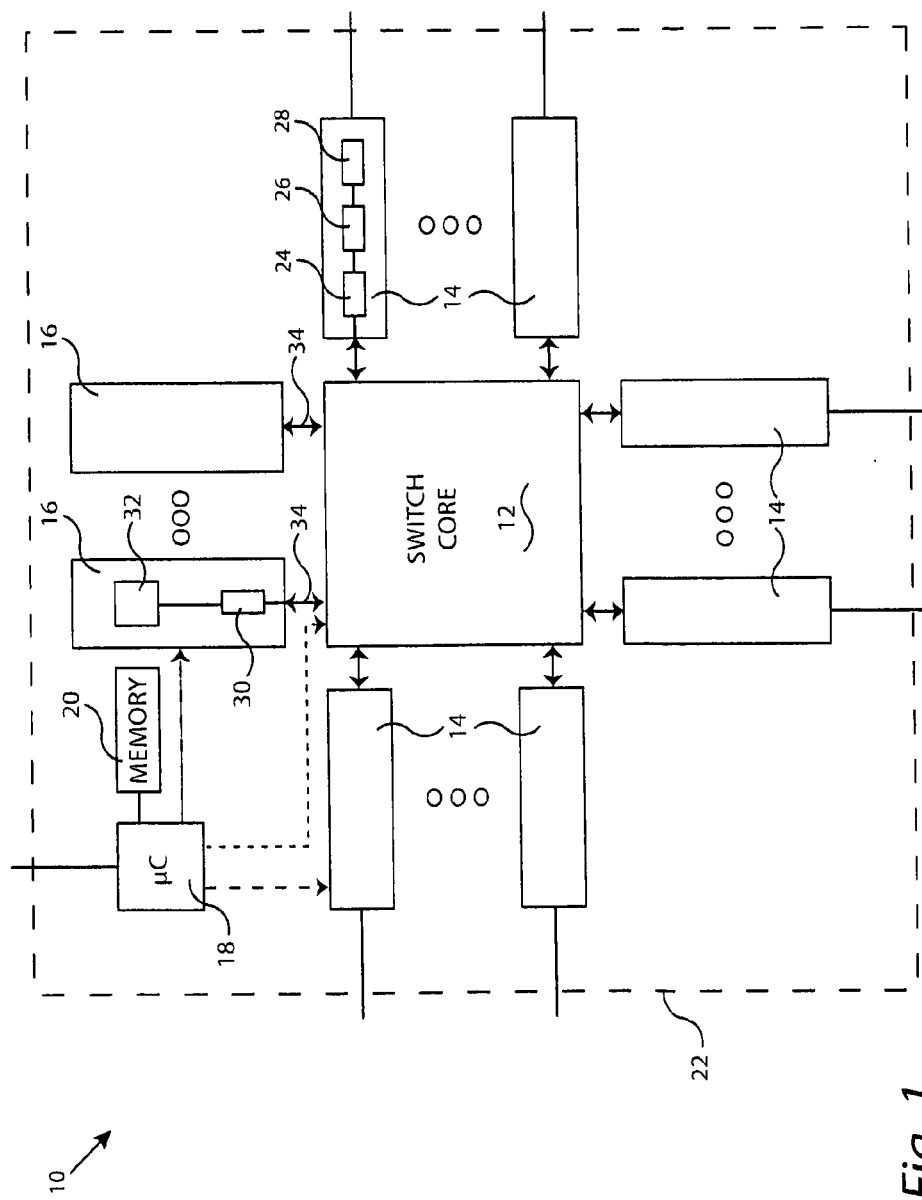
FIG. 1 is a block diagram of an example SAS expander of the prior art.

FIG. 1 was described with reference to the prior art. Like reference numerals will refer to like components in the descriptions set forth herein.

Figure 2:
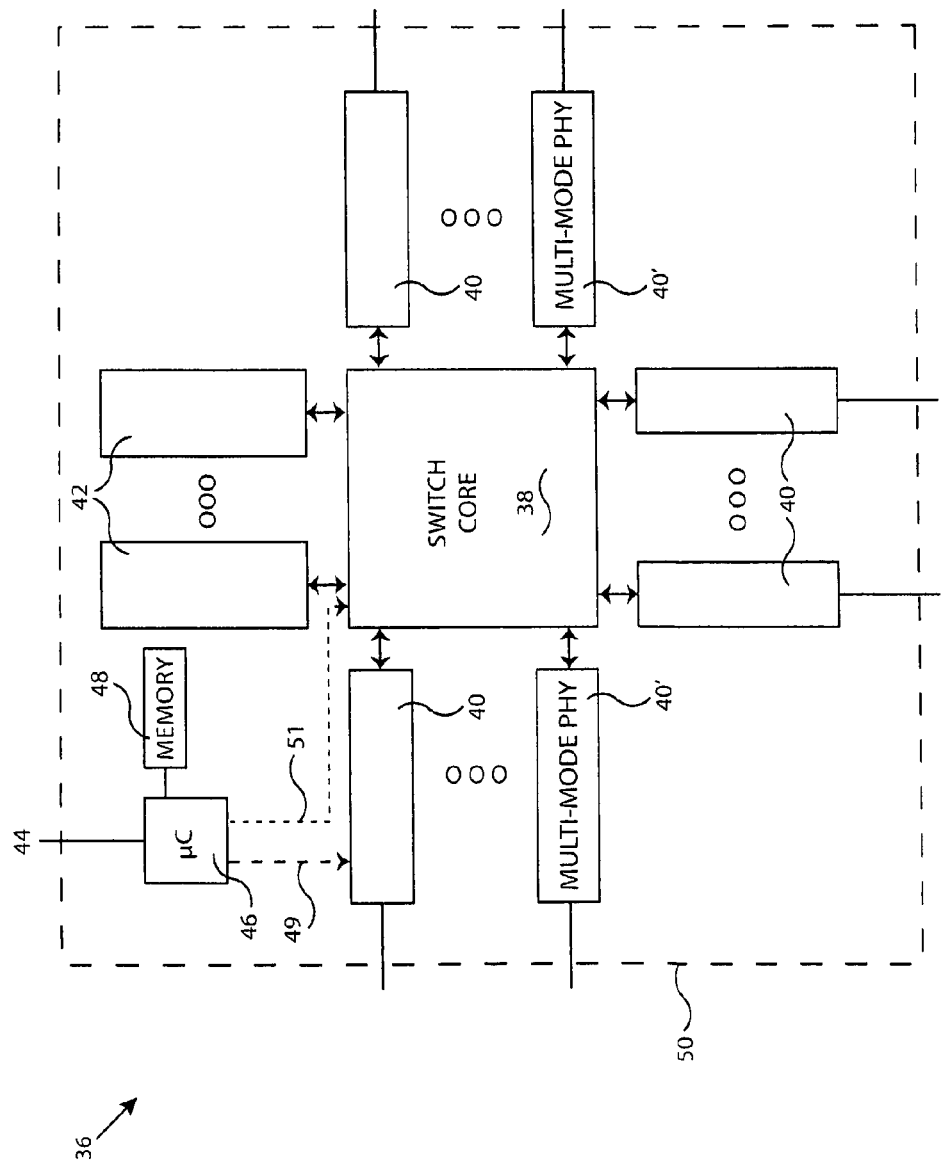
FIG. 2 is a block diagram of an example SAS expander including SAS expander multimode phys.

FIG. 2 is block diagram, set forth by way of example and not limitation, of a SAS expander 36 including a switch core 38, a plurality of SAS expander phys 40 coupled to the switch core 38 (at least two of which are SAS expander multimode phys 40'), and one or more SMP internal ports 42 coupled to the switch core 38. The SAS expander 36 also includes, in this example, a microcontroller (μC) 46 and memory 48. SAS expander 36 often forms a part of an integrated circuit 50, as will be appreciated by those of skill in the art.

As used herein, by way of example, a "switch core" refers to circuitry implementing Expander Connection Manager (ECM) and Expander Connection Router (ECR) functionalities. As well known to those of skill in the art, an ECM implements a control function that sets up and tears down connections and the ECR comprises a crossbar multiplexer, for example, that routes the actual data. The switch core 38 logic can take many forms, including discrete logic, state machines, microcontrollers, etc.

SAS expander phys 40 can operate as described with reference to prior art SAS expander phys 14 of FIG. 1 ("normal operation mode"). SAS expander multimode phys 40', by way of non-limiting example, can operate in a normal operational mode and in an alternate operational mode. In a further example embodiment, the alternate operational mode is a first alternate operational mode and the SAS expander multimode phys further include a second alternate operational mode. In yet further embodiments, the SAS expander multimode phys can have two or more configurable operational modes (e.g. two, three, four, etc. operational modes) which may or may not include an operational mode.

By way of non-limiting examples, a normal operation mode can be as described as previously with respect to prior art SAS expander phys 14 of FIG. 1, a first alternate operational mode can be a static endpoint mode and a second alternate operational mode can be a static infrastructure mode. By way of further non-limiting examples, the first alternate operational mode and the second alternate operational mode can both be static endpoint modes or can both be static infrastructure modes.

An arbitrary number of SAS expander phys 40 can be provided depending upon the application although, in this example, at least two are SAS expander multimode phys 40'. For example, twelve SAS expander phys 40 can be provided. In an embodiment, all of the SAS expander phys 40 are SAS expander multimode phys 40'. An example SAS expander multimode phys 40' will be discussed in greater detail with respect FIGS. 6-8.

Microcontroller 46 provides programmable logic control for SAS expander 36. By way of non-limiting example, microcontroller 46 can be a MIPS microcontroller core developed by MIPS Technologies of Sunnyvale, Calif. Other microcontrollers, microprocessors, etc. are also suitable examples of programmable logic devices. In other examples, microprocessor 46 may be replaced with other forms of logic, such as state machines, or eliminated.

In this example, microcontroller 46 is coupled to a physical memory 48 (i.e. a non-transitory computer readable media) which can be provided "on chip" as shown or which may be accessed "off chip" by a connection 44. Suitable memory 48 includes, without limitation, RAM, ROM, EPROM, flash memory, etc. In other examples, memory 48 may be replaced with other forms of memory or eliminated.

Microcontroller 46 can be connected to SAS expander phys 40 and 40' and to switch core 38 as indicated by broken lines 49 and 51, respectively, to provide programmable logic control for SAS expander 36. The program, comprising a plurality of code segments, can be stored, for example, in memory 48 or elsewhere, such as off chip and accessed by, for example, connection 44. These code segments can implement a variety of functions, including configuring the SAS expander multimode phys 40', as will be explained in greater detail subsequently.

Figure 3:
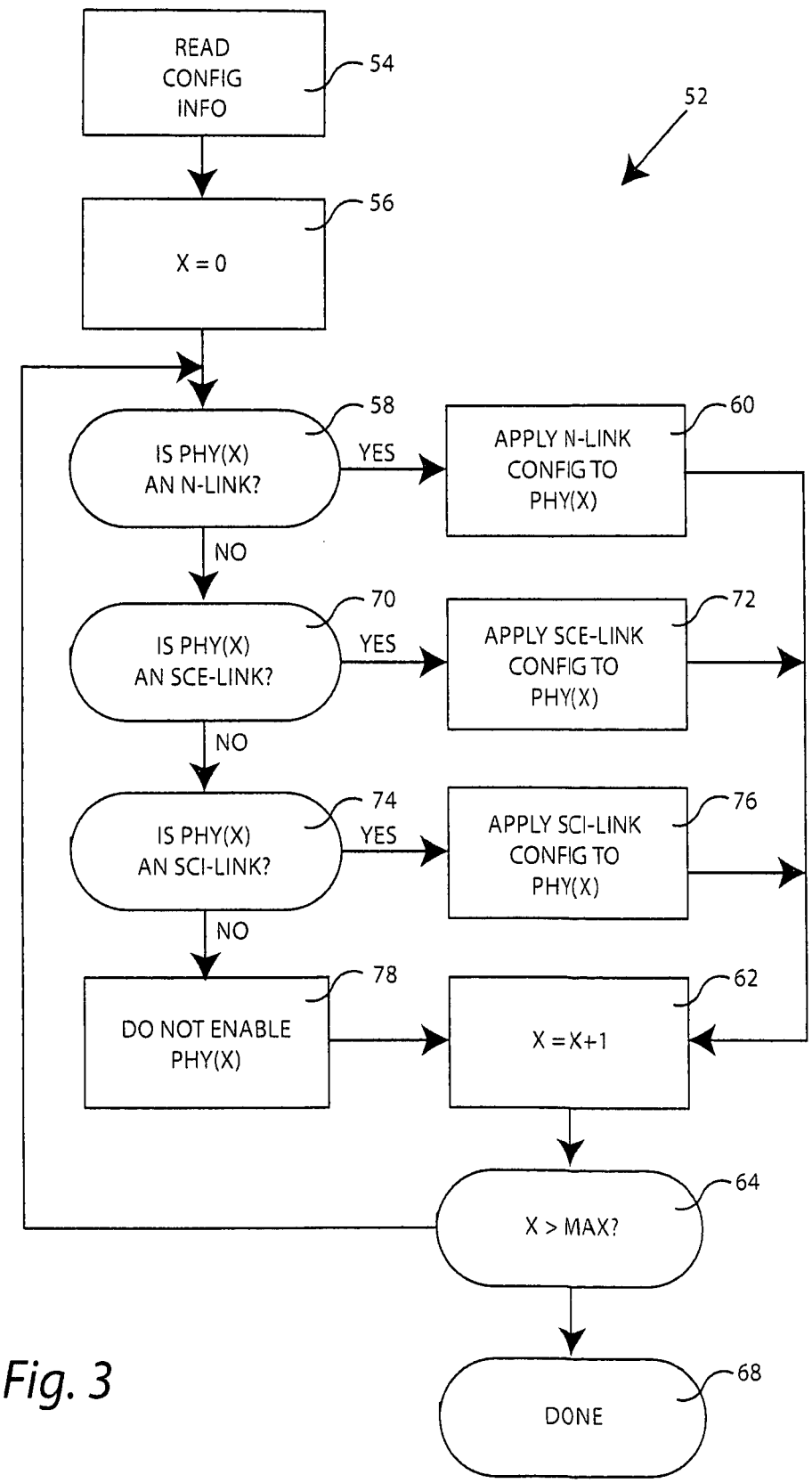
FIG. 3 is a flow diagram of an example process to configure the SAS expander multimode phys of FIG. 4.

FIG. 3 is a flow diagram of a process 52, set forth by way of example and not limitation, for configuring the SAS expander multimode phys 40' of FIG. 2. In this example, it is assumed that the multimode expander phys 40' have a normal ("N-link") mode, a static endpoint ("SCE-link") mode, and a static infrastructure ("SCI-link") mode. Code segments implementing process 52 can be stored, for example, in memory 48 and executed, for example, by microcontroller 46.

Example configuration process 52 begins with reading configuration information in an operation 54. This configuration information can be stored in memory 48 or elsewhere. A counter "X" is then initialized to zero in an operation 56. Next, in an operation 58, it is determined, using the configuration information, if Phy(X), i.e. the $X^{th}$ multimode expander phy 40', is to operate as an N-link. If so, an operation 60 applies an N-link configuration to Phy(X). Then, counter X is incremented in operation 62 and is compared to the total number ("MAX") of SAS expander multimode phys 40' to be configured. If the counter X is less than or equal to MAX, process control returns to operation 58. Otherwise, the example configuration process 52 ends at 68.

If it is determined in operation 58 that Phy(X) is not an N-link, an operation 70 determines whether it is an SCE-link. If it is, an operation 72 applies an SCE-link configuration to Phy(X), and process control is transferred to operation 62. If it is not, an operation 74 determines whether it is an SCI-link. If so, an operation 76 applies a SCI-link configuration to Phy(X), after which process control is again transferred to operation 62. Also, in this example, if operation 74 determines that Phy(X) is not an SCI-link (meaning that Phy(X) is not one of an N-link, an SCE-link or an SCI-link), an operation 78 does not enable (or alternately disables) Phy(X) before turning over process control to operation 62.

It should be noted that the process 58 is set forth only by way of example and that these and/or other configuration operations can be accomplished in different orders. Also for example, one of the modes, such as the normal or N-link mode, can be a default, eliminating the need for other operations such as 58, 60 and 78, or can be eliminated.

FIG. 4 is a block diagram of a Service Delivery Subsystem 80, set forth by way of example and not limitation. In this example, the Service Delivery Subsystem 80 includes two SAS expanders 50, namely SAS expander 50A and SAS expander 50B. The Service Delivery Subsystem 80 is shown coupled to an Initiator 82 and to two targets, namely a Target 84 and a Target 86, in order to describe an example operation of the Service Delivery Subsystem 80.

It will be appreciated that Service Delivery Subsystems can include more than two SAS expanders 50, such as one or more intermediate SAS expanders 50 provided between SAS expander 50A and SAS expander 50B. Also, there may be additional SAS expanders 50 at "endpoints", e.g. connected to an initiator and/or target and other combinations.

In this example, the Initiator 82 can be a computer or other computerized device and Targets 84 and 86 can be peripherals such as disk drives. Also, for the purpose of this example, it can be assumed that Target 86 is a high priority target such as a boot drive, where is it desirable to minimize the latency of the transmission of data between the Initiator 82 and the Target 86.

In this example, the SAS expander 50A has four SAS expander multimode phys 40', namely SAS expander multimode phys 40'a, 40'b, 40'c and 40'd. In this example, the SAS expander 50B also has four SAS expander multimode phys 40', namely SAS expander multimode phys 40'e, 40'f, 40'g and 40'h. Multimode SAS expanders 40'a, 40'b, 40'e and 40'f have, in this example, been configured in N-link modes. Also, in this example, SAS expander multimode phys 40'c and 40'h have been configured in SCE-link modes and SAS expander multimode phys 40'd and 40'g have been configured in SCI-link modes.

With continuing reference to FIG. 4, SAS expander multimode phy 40'a is connected to Initiator 82 by a differential pair 88, SAS expander multimode phy 40'b is coupled to SAS expander multimode phy 40'e by a differential pair 90, SAS expander multimode phy 40'f is coupled to Target 84 by a differential pair 92, SAS expander multimode phy 40'c is coupled to Initiator 82 by a differential pair 94, SAS expander multimode phy 40'd is coupled to SAS expander multimode phy 40'g by a differential pair 96 and SAS expander multimode phy 40'h is coupled to Target 86 by differential pair 98. The differential pairs 88-98 can, by way of non-limiting examples, comprise cables, portions of cables, wires, traces and/or other electrically conductive structures.

It should be noted that a SAS expander multimode phy 40' that connects to either an Initiator or to a Target is configured as an SCE-link. Also, a SAS expander multimode phy 40' that connects to another SAS expander multimode phys 40' is configured as an SCI-link. Therefore, for example, an intermediate SAS expander coupled between SAS expanders 50A and 50B would have its SAS expander multimode phys 40' configured as SCI links.

FIG. 5 is a functionally equivalent block diagram of the Service Delivery Subsystem 80 of FIG. 4 connected between the Initiator 80 and the Targets 84 and 86. In this example, data signals propagated between Initiator 82 and Target 84 traverse a pair of virtual SAS expanders 100A and 100B with the accompanying delays ("latency") inherent to the normal operation of SAS expanders. However, data signals propagated between Initiator 82 and Target 86 traverse a "virtual link" 99 having a latency analogous to that of a direct link (e.g. with a cable, wire, etc.). That is, the data carried along the path defined by differential pair 94, SCE-link 40'c, switch core 38A, SCI-link 40'd, differential pair 96, SCI-link 40'g, switch core 38B, SCE-link 40'h, and differential pair 98 flows without substantial delay or latency. The "virtual link" between an Initiator and a Target therefore emulates a physical link in order to achieve a low latency connection.

Figure 6:
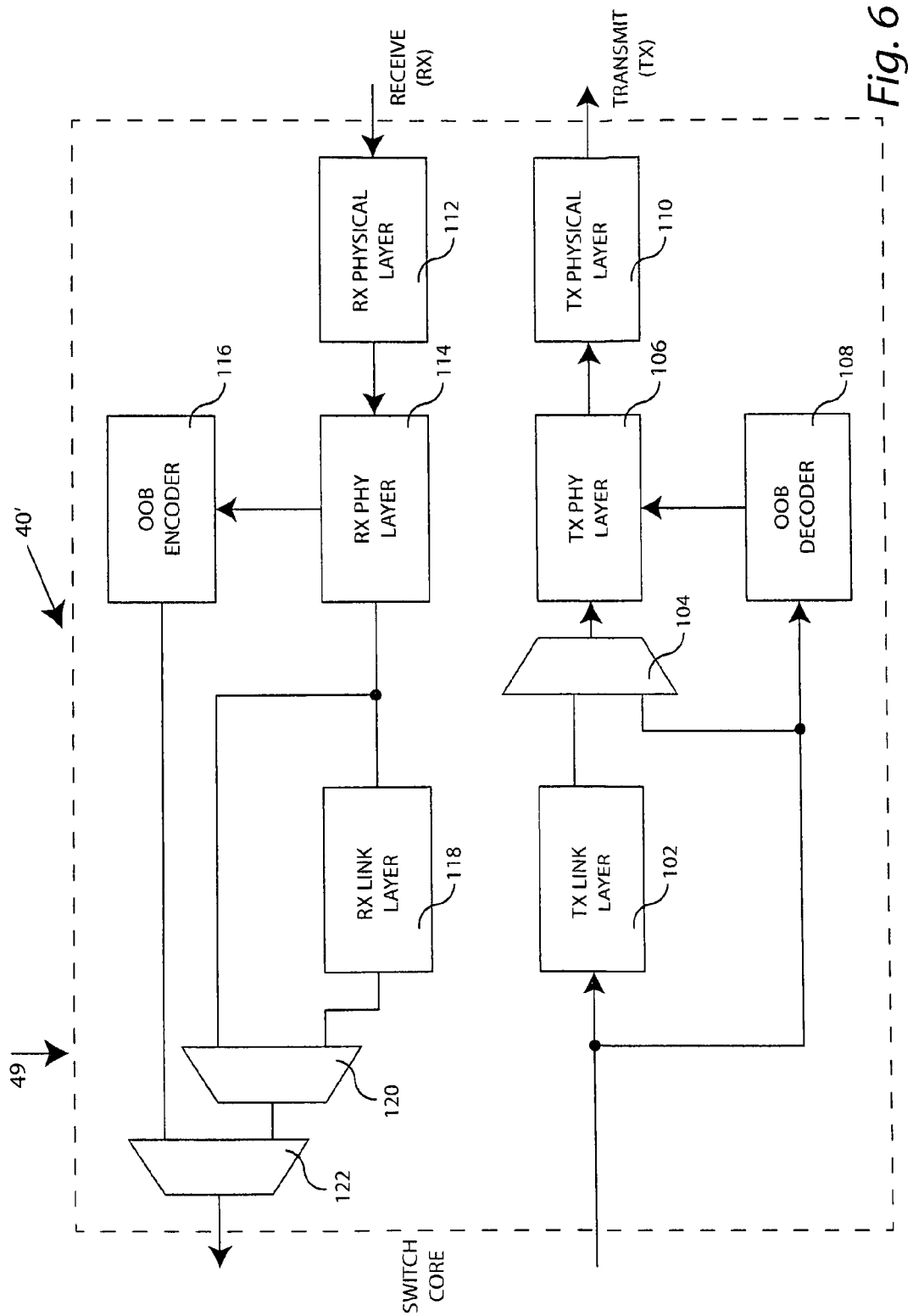
FIG. 6 is a block diagram of an example SAS expander multimode phy.

FIG. 6 is a block diagram of a SAS expander multimode phy 40', set forth by way of example and not limitation. The example SAS expander multimode phy 40' includes, along a transmit path, a TX link layer 102, a multiplexer 104, a TX phy link layer 106, an OOB decoder 108, and a TX physical link layer 110. The example SAS expander multimode phy 40' further includes, along a receive path, an RX physical link layer 112, an RX phy link layer 114, on OOB encoder 116, an RX link layer 118, a multiplexer 120, and a multiplexer 122. Components of the SAS expander multimode phy 40', such as the multiplexers, can be digitally controlled, such as by control line 49 of microcontroller 46.

The TX link layer 102, TX phy link layer 106 and TX physical link layer operate as in a normal SAS expander phy. Multiplexer 104 and OOB decoder 108 allow the transmit path to be operated in a normal mode and in alternate modes. Likewise, RX physical link layer 112, RX phy link layer 114 and RX link layer 118 operate as in a normal SAS expander phy. OOB encoder 116 and multiplexers 120 and 122 allow the receive path to be operated in a normal mode and in alternate modes.

By way of non-limiting example, when operating as an N-link, the multiplexers can be configured as follows: multiplexer 122 selects the output, of multiplexer 120, multiplexer 120 selects the datapath through the RX link layer 118, and multiplexer 104 selects the datapath through the TX link layer 102. By way of further non-limiting example, when operating as an SCE-link, the multiplexers can be configured as follows: multiplexer 122 selects the output of the OOB encoder 116, multiplexer 120 selects to output of the RX phy layer 114 (e.g. the datapath that bypasses the RX link layer 118), and the multiplexer 104 selects the datapath that bypasses the TX link layer 102. By way of still further non-limiting example, when operating as an SCI-link, the multiplexers can be configured as, follows: multiplexer 122 selects the output of multiplexer 120, multiplexer 120 selects the output of the RX phy layer 114 (e.g. the datapath that bypasses the RX link layer 118), and multiplexer 104 is configured to select the datapath that bypasses the TX link layer 102.

Figure 7:
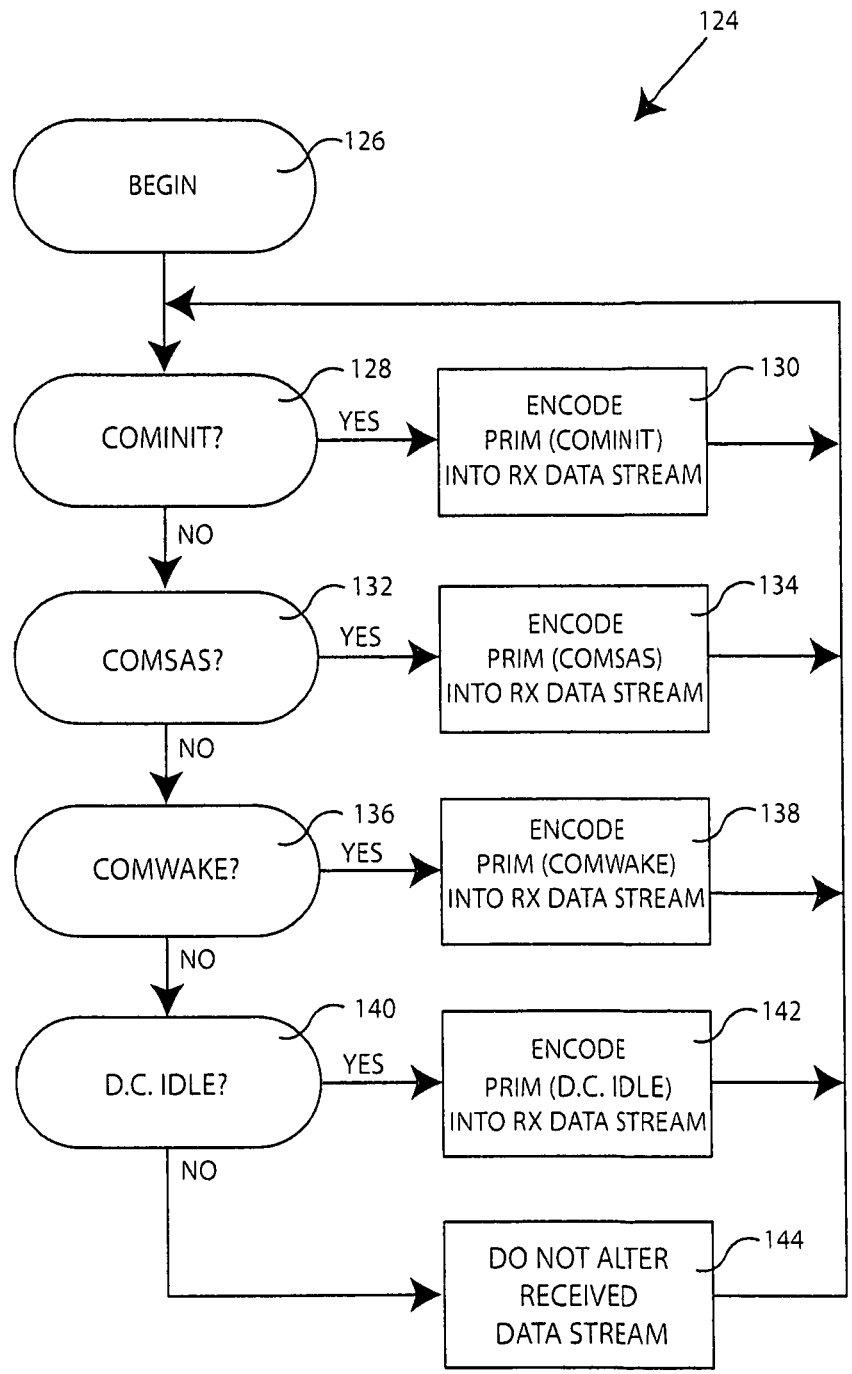
FIG. 7 is a flow diagram of an example process of an OOB Encoder of FIG. 6.

FIG. 7 is a flow diagram of an example process 124 of an OOB encoder 116 of FIG. 6. It should be noted that the process 124 is set forth only by way of example. For example, the operations can be accomplished in different orders and with more, fewer, or different operations. Also, different detection and encoding techniques can be used, as will be appreciated by those of skill in the art.

Example process 124 begins at 126 and, in a decision operation 128, it is determined if there is a COMINIT code in the data stream. If so, an operation 130 encodes a Prim(COMINIT) code into the RX data stream and process control return to operation 128 at the top of the loop. If there isn't a COMINIT code in the RX data stream, an operation 132 determines if there is a COMSAS code in the RX stream in an operation 132 and, if there is, an operation 134 encodes a Prim(COMSAS) code into the RX data stream before returning control to operation 128. If there isn't a COMSAS code in the RX data stream, an operation 136 determines if there is a COMWAKE code in the RX stream and, if there is, an operation 138 encodes a Prim(COMWAKE) code into the RX data stream and returns control to operation 128. If there isn't a COMWAKE code in the RX data stream, an operation 140 determines if there is a D.C. Idle and, if so, encodes a Prim (D.C. Idle) code into the RX data stream in an operation 142 before returning control to operation 128. If there was no D.C. Idle detected, the RX data stream remains unaltered and control returns to operation 128.

The terms COMINIT, COMSAS, COMWAKE and D.C. Idle are COB signals defined in the SAS standard (incorporated herein by reference) and are well known to those of skill in the art. The terms refer to electrical signaling sequences issued on a SAS link to communicate particular states during the standard link negotiation process. These signals are typically sent prior to completing the link initialization process, because they involve periods of time when the SAS transmitter is disabled and a common mode (D.C. Idle) signal level occurs on the SAS link. Because of this, normal clock-and-data recovery is disrupted by these signals so their presence on an active SAS link can cause the disabling of the SAS link. Once SAS link initialization completes, a continuous stream of differential bits using 8b10 encoding rules is transmitted precluding the propagation of these OOB signals.

Figure 8:
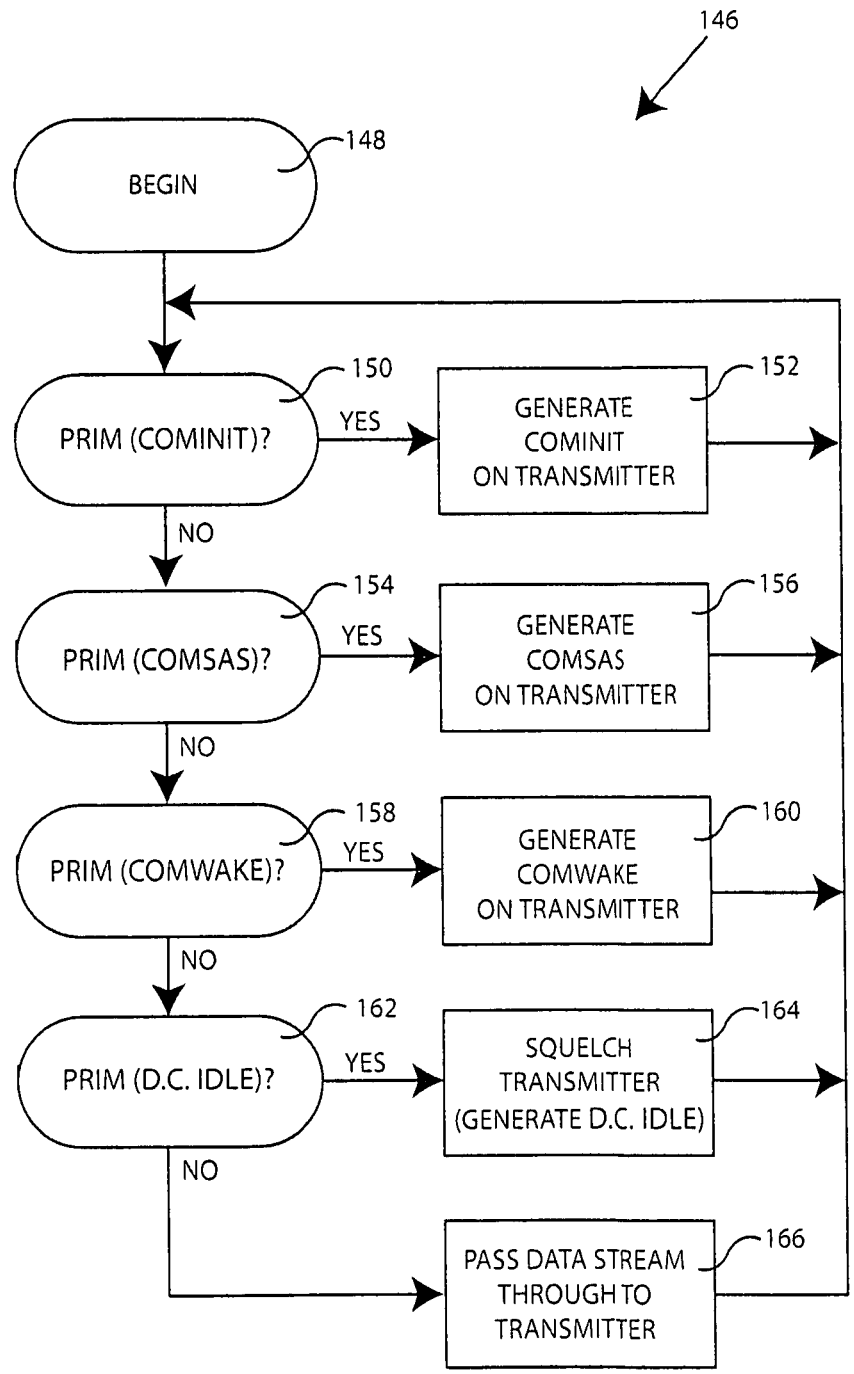
FIG. 8 is a flow diagram of an example process of an OOB Decoder of FIG. 6.

FIG. 8 is a flow diagram of an example process 146 of an OOB decoder 108 of FIG. 6. It should be noted that the process 146 is set forth only by way of example. For example, the operations can be accomplished in different orders and with more, fewer, or different operations. Also, different detection and encoding techniques can be used, as will be appreciated by those of skill in the art.

Example process 146 begins at 148 and, in a decision operation 150, it is determined if there is a COMINIT code in the data stream. If so, an operation 152 encodes a Prim(COMINIT) code into the RX data stream and process control return to operation 150 at the top of the loop. If there isn't a COMINIT code in the RX data stream, an operation 154 determines if there is a COMSAS code in the RX stream in an operation 154 and, if there is, an operation 156 encodes a Prim(COMSAS) code into the RX data stream before returning control to operation 150. If there isn't a COMSAS code in the RX data stream, an operation 158 determines if there is a COMWAKE code in the RX stream and, if there is, an, operation 160 encodes a Prim(COMWAKE) code into the RX data stream and returns control to operation 150. If there isn't a COMWAKE code in the RX data stream, an operation 162 determines if there is a D.C. Idle and, if so, encodes a Prim (D.C. Idle) code into the RX data stream in an operation 164 before returning control to operation 150. If there was no D.C. Idle detected, the RX data stream remains unaltered and control returns to operation 150.

The terms Prim(COMINIT), Prim(COMSAS), Prim (COMWAKE) and Prim(D.C. Idle) as used herein refer to new, custom SAS primitives that are not presently defined in the SAS standard but are compatible with SAS signaling rules on an active SAS link such as that the primitives are 40-bits in length and properly 8b10b encoded using a 10-bit K-character followed by 3 10-bit D-characters. As will be appreciated by those of skill in the art, the choice of how these primitives are defined are dependent upon an actual implementation. For example, these primitives can be existing, reserved SAS primitives remapped for this purpose, or they can be new SAS primitives that are compatible with the SAS physical layer and phy layer but are not presently defined by any standard.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A SAS expander with multimode phys comprising:
a switch core;
a plurality of SAS expander phys coupled to said switch core each of which includes an RX link layer and a TX link layer, wherein at least two of said plurality of SAS expander phys are SAS expander multimode phys; and
logic coupled to said SAS expander multimode phys to configure each of said SAS expander multimode phys in one of a normal operational mode (N-link) phy a static endpoint mode (SCE-link) phy and a static infrastructure mode (SCI-link) phy; wherein said static endpoint mode and said infrastructure mode are alternate operational modes which bypass the RX link layer and the TX link layer such that communication between the at least two SAS expander multimode phys comprise a portion of a virtual link;
whereby said N-link phy is configured to communicate with one of an initiator that originates device-service and tasks management requests, a target that originates device-service and tasks management requests, and another N-link phy, said SCE-link phy is configured to communicate with one of said initiator and said target, and said SCI-link phy is configured to communicate with another SCI-link phy.

2. A SAS expander with multimode phys as recited in claim 1 wherein said virtual link is made through said core.

3. A SAS expander with multimode phys as recited in claim 2 wherein said multimode expander phys include an OOB Encoder and an OOB Decoder.

4. A SAS expander with multimode phys as recited in claim 3 wherein said multimode expander phys include a configurable receive path including said OOB Encoder and a MUX coupled to said OOB Encoder and a configurable transmit path including said OOB Decoder and a MUX coupled to said OOB Decoder.

5. A SAS Service Delivery Subsystem comprising:
a first endpoint SAS expander including a first switch core each of which includes an RX link layer and a TX link layer and a first plurality of SAS expander phys coupled to said first switch core, where at least two of said first plurality of SAS expander phys are SAS expander multimode phys; and
a second endpoint SAS expander including a second switch core and a second plurality of SAS expander phys coupled to said second switch core each of which includes an RX link layer and a TX link layer, where at least two of said second plurality of SAS expander phys are SAS expander multimode phys;
wherein a first pair of SAS expander multimode phys of said first endpoint SAS expander include a first static configured endpoint phy and a first static configured infrastructure phy wherein the RX link layer and the TX link layer are bypassed, and a second pair of SAS expander multimode phys of said second endpoint SAS expander include a second static configured endpoint phy and a second static configured infrastructure phy; and wherein said first static configured endpoint phy is electrically connected to an initiator, said second static configured endpoint phy is electrically connected to a target, and said first static configured infrastructure phy is electrically connected to said second static configured infrastructure phy, wherein the RX link layer and the TX link layer are bypassed to form a part of a virtual link between said initiator and said target.

6. A SAS Service Delivery Subsystem as recited in claim 5 wherein said virtual link extends through said first switch core and said second switch core.

7. A SAS Service Delivery Subsystem as recited in claim 5 further comprising at least one intermediate SAS expander coupled between said first endpoint SAS expander and said second endpoint SAS expander.

8. A SAS Service Delivery Subsystem as recited in claim 7 wherein said intermediate SAS expander includes a pair of SAS expander multimode phys configured as a static infrastructure phy, wherein the RX link layer and the TX link layer are bypassed.

9. A SAS Service Delivery Subsystem as recited in claim 8 wherein said static infrastructure phys of said at least one intermediate SAS expander are coupled to said first static configured infrastructure phy and said second static infrastructure phy and form a part of said virtual link.

10. A method for providing a virtual link with a SAS expander comprising:

providing a SAS expander having a plurality of reconfigurable multimode phys each of which includes an RX link layer and a TX link layer, wherein said plurality of reconfigurable multimode phys are reconfigurable between normal, static endpoint and static infrastructure modes; and configuring a pair of said reconfigurable multimode phys to include a static endpoint phy and a static infrastructure phy, including bypassing their RX link layers and TX link layers;

whereby said static endpoint phy is configured to communicate with one of an initiator and a target, and said static infrastructure phy is configured to communicate with another static infrastructure phy to form a part of a virtual link.

11. A method for providing a virtual link with a SAS expander as recited in claim 10 wherein signals of said pair of reconfigurable multimode phys are transmitted through a core of said SAS expander.

12. A method for providing a virtual link with a SAS expander as recited in claim 11 further comprising:

providing a second SAS expander having a plurality of reconfigurable multimode phys; and configuring one of said reconfigurable multimode phys of said second SAS expander to be a static infrastructure phy configured to communicate with a static infrastructure phy of said first multimode SAS expander, including bypassing the RX link layer and the TX link layer.

* * * * *